(12) United States Patent
Rogers et al.

(10) Patent No.: US 9,182,897 B2
(45) Date of Patent: Nov. 10, 2015

(54) METHOD AND APPARATUS FOR INTUITIVE WRAPPING OF LISTS IN A USER INTERFACE

(75) Inventors: Sean S. Rogers, San Diego, CA (US); Samuel J. Horodezky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 13/092,692

(22) Filed: Apr. 22, 2011

(65) Prior Publication Data

US 2012/0272181 A1   Oct. 25, 2012

(51) Int. Cl.
*G06F 3/00* (2006.01)
*G06F 3/0485* (2013.01)
*G06F 3/0482* (2013.01)
*G06F 3/0488* (2013.01)

(52) U.S. Cl.
CPC ............ *G06F 3/0485* (2013.01); *G06F 3/0482* (2013.01); *G06F 3/04883* (2013.01)

(58) Field of Classification Search
CPC .................................................... G06F 3/0484
USPC ......................................... 715/784, 810, 830
See application file for complete search history.

(56) References Cited

U.S. PATENT DOCUMENTS

| | | | |
|---|---|---|---|
| 7,469,381 B2 | 12/2008 | Ording | |
| 7,844,915 B2 * | 11/2010 | Platzer et al. | 715/781 |
| 7,872,640 B2 | 1/2011 | Lira | |
| 7,872,652 B2 | 1/2011 | Platzer et al. | |
| 2003/0182628 A1 | 9/2003 | Lira | |
| 2006/0038796 A1 | 2/2006 | Hinckley et al. | |
| 2008/0168384 A1 * | 7/2008 | Platzer et al. | 715/784 |
| 2009/0231271 A1 | 9/2009 | Heubel et al. | |
| 2010/0175027 A1 * | 7/2010 | Young et al. | 715/830 |
| 2010/0277420 A1 | 11/2010 | Charlier et al. | |
| 2010/0281374 A1 | 11/2010 | Schulz et al. | |
| 2011/0090255 A1 * | 4/2011 | Wilson et al. | 345/647 |
| 2011/0093812 A1 | 4/2011 | Fong | |
| 2011/0202859 A1 * | 8/2011 | Fong | 715/769 |
| 2011/0252362 A1 * | 10/2011 | Cho et al. | 715/784 |

FOREIGN PATENT DOCUMENTS

| | | |
|---|---|---|
| JP | 2004265244 A | 9/2004 |
| JP | 2010515978 A | 5/2010 |
| JP | 2010237902 A | 10/2010 |
| WO | 2010138115 A1 | 12/2010 |

OTHER PUBLICATIONS

International Search Report and Written Opinion—PCT/US2012/033209—ISA/EPO—Jul. 16, 2012.

* cited by examiner

*Primary Examiner* — Steven B Theriault
(74) *Attorney, Agent, or Firm* — Shirin Tefagh; Joseph Agusta

(57) ABSTRACT

The methods and devices of the various aspects provide a visual indication in a graphical user interface that a document boundary is or will soon be reached, and a mechanism for wrapping the list on the display so that it appears to snap to the other end of the list (i.e., from beginning to end if scrolling up, or end to beginning if scrolling down) when sufficient user input is applied. The displayed snap to the end or beginning of the list may also be implemented in response to a momentum list scroll initiated by a flick gesture when the momentum scroll would otherwise scroll the list a threshold distance beyond a list boundary.

22 Claims, 12 Drawing Sheets

METHOD AND APPARATUS FOR INTUITIVE WRAPPING OF LISTS IN A USER INTERFACE

FIELD OF THE INVENTION

The present invention relates generally to computing device user interfaces and more particularly to methods and systems for presenting lists in a graphical user interface.

BACKGROUND

Portable and mobile computing devices are becoming ubiquitous tools of modern society for finding and displaying information. The majority of displays that users interact with on smart phones, iPods, computers and other electronic devices are lists of some sort. Music lists, contacts, documents, media files, settings, application menus, email inboxes, electronic books, etc. all fit well in vertical or horizontal scroll views which are frequently organized or presented as lists having a start and an end. Many user interfaces (UIs) implement ways of handling the edges of list views. Examples of ways of handling strict boundary cases by stretching the document, include showing "beyond the edge" with blank space. Most user interfaces require the user to scroll back through the list to reach the other end.

SUMMARY

The various aspects include a user interface method executed on a computing device that provides an intuitive response to user inputs that enables efficient navigation through end boundaries of lists. The various aspects enable users to move from the beginning to the end or from the end to the beginning of a list without having to traverse the whole list. This is referred to as wrapping. In particular, the various aspects include a method for presenting a list on a graphical user interface that includes receiving a content display movement user input in the computing device, determining an end location of a content movement based upon the user input, determining if the determined end location of the content movement would extend a first threshold distance from an edge of the display, snapping an element of the content on a current side of the content boundary to the display if the determined end location of the content movement would not extend beyond the first threshold distance from the edge of the display, and snapping an element of the content on an opposite side of the content boundary to the display if the determined end location of the content movement would extend beyond the first threshold distance from the edge of the display.

The various aspects may also include determining whether the content movement end location would cause the boundary of the content to come within a second threshold distance of the edge of the display, modifying the animation of the content movement display to indicate the content boundary is about to be reached, determining when the user finger is no longer in contact with the touch screen display, initiating a momentum scroll animation, and accelerating the momentum scroll animation as the content boundary approaches the edge of the display prior to snapping an element of the content on an opposite side of the content boundary to the display when the determined end location of the content move would extend beyond the first threshold distance from the edge of the display. Receiving a content display movement user input in the computing device may include receiving an input in response to a user finger drag on a touch screen display, and/or receiving a flick gesture input on a touch screen display. Snapping the element of the content to the display may occur in response to the user ceasing the user input, and snapping the element of the content on the opposite side of the content boundary to the display may occur when the determined end location of the content extends beyond the first threshold distance from the edge of the display. Determining an end location of a content movement scroll animation may include determining the end location of the content movement that will be reached when the momentum scroll is completed.

A further aspect includes a computing device including a memory and a display coupled to a processor in which the processor is configured with processor executable instructions to perform operations of the methods described above. A further aspect includes a computing device including means for performing the operations of the methods described above. A further aspect includes a non-transitory processor-readable storage medium having stored thereon processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1A:
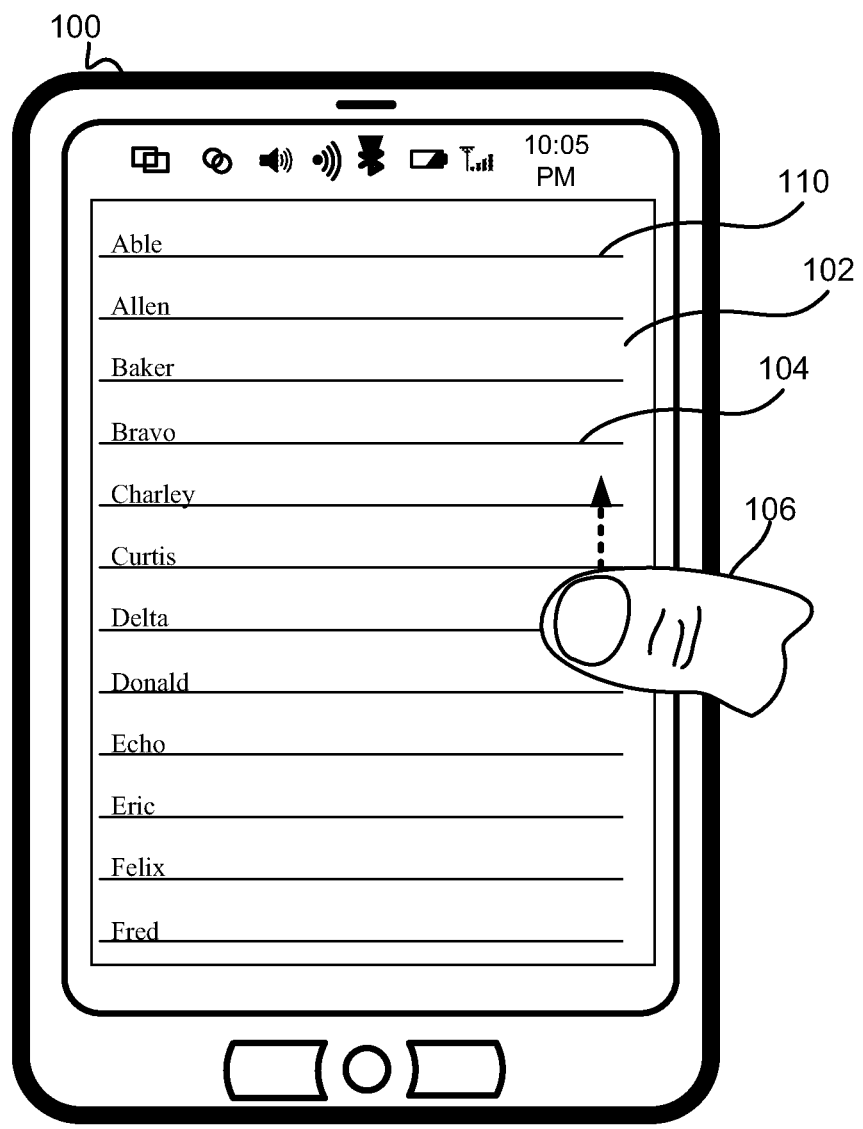
FIGS. 1A through 1D are frontal views of a computing device illustrating displays resulting from a user interaction with a graphical user interface according to the various aspects.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" and "mobile computing device" refer to any one or all of cellular telephones, personal television receivers, personal data assistants (PDAs), palm-top computers, notebook computers, personal computers, wireless electronic mail receivers and cellular telephone receivers (e.g., the Blackberry® and Treo® devices), multimedia Internet enabled cellular telephones (e.g., the Blackberry Storm®), and similar electronic devices that include a programmable processor, memory, and a display.

Many modern applications that run on personal computing devices involve the presentation of documents which are displayed in the form of lists or pages which extend beyond the viewable portion that is presented on the display screen. Examples include lists of emails in an electronic mail application, contact lists in a personal phonebook application, lists of events in a calendar application, electronic books, and long text documents in word processing and document viewer applications. Most graphical user interfaces enable users to scroll through such documents in order to view portions that are beyond the boundaries of the display. Previous graphical user interfaces enabled such scrolling until an end of the document or file was reached, either the end or the beginning. At that point, the user must scroll back in order to view other portions of the document. For example, if a user is viewing a list near the end of its contents and desires to view an entry near the beginning of the list, the graphical user interface requires the user to scroll back through the list even though the currently displayed entry is closer to the desired list entry if the list could wrap (i.e., move from the last entry to the first entry and vice versa). Wrapping of lists in graphical user interfaces can lead to user confusion since the user may not recognize when the list (which may not be alphabetical or numbered) has scrolled past the end or beginning (depending upon the direction of the scroll) and wrapped to the other end (i.e., beginning or end).

The various aspects provide methods for animating movements of content within a display window at both the beginning and end of a document in a graphical user interface. The aspect methods allow the user to quickly alternate between entries on either side of a boundary of the document or list, while providing transitions that indicate that a list wrap is about to occur. For ease of reference, such animating movements of content within a display window are referred to here as scrolling or scroll animation; however, the claims are not limited to scrolling motions and encompass other types of movement animations, such as sliding, flipping (as in pages of an e-book), fading, etc. The aspect methods may further include adjusting the content movement animations to provide visible changes in the movement (e.g., scroll) behavior and a "snap" of the document boundary to an edge (e.g., top, bottom or side) of the display window when the user ends the scroll command. The aspects provide an elegant mechanism of indicating the edge of a list, allowing list wrapping to quickly jump to the end or beginning of the list, and indicating what the list will do when the user finishes the active transition. In this manner a user may recognize when a list boundary is reached and be provided with an intuitive feedback that indicates when a list wrap is about to be executed. The visible indication may be followed by a snap of the list beginning or end to the appropriate display edge rather than simply continuing to scroll.

In overview, the methods and devices of the various aspects provide an intuitive visual indication in a graphical user interface that a list boundary is or will soon be reached, such as through a speed, scroll-drag-ratio or direction change. The aspects further provide a mechanism for presenting the list on the graphical user interface in a manner that causes it to appear to snap to the other end of the list (i.e., from beginning to end if scrolling up, or end to beginning if scrolling down) when sufficient user input is applied. Such additional user input may include, for example, a continued scroll command by a user via a user input mechanism (e.g., by dragging a finger on a touch screen or performing a click and drag input via a computer mouse) after the end of the list is indicated. The displayed snap to the end or beginning of the list may also be implemented in response to a momentum list scroll initiated by a flick gesture in which the momentum scroll would otherwise scroll the list a threshold "distance" beyond a list boundary (e.g., the end or beginning of the list).

The various aspects are particularly applicable to computing devices having touch screen interfaces, and related to animations associated with drag and flick touch screen gestures. However, the aspects and the claims are not limited to those types of user interfaces unless specifically recited in the claims. For example, the aspects may be implemented on other types of touch interfaces, such as the rotary touch sensor on the Apple iPod and the touch pads on laptop computers. Further, the aspects may also be implemented on computing devices configured with other types of pointing devices, such as a computer mouse or trackball. Thus, while the various aspects are explained with reference to touch screen interface examples, the claims should not be limited to touch screen interface animations unless specifically recited in the claims. Also, a variety of list indicating feedback mechanisms may be used, so the claims should not be limited to a particular animation feature unless specifically recited. However, to provide examples of how the invention could be implemented the following figures illustrate two embodiments.

In an aspect, when the boundary of a list has been reached, and the displayed content is about to or is being snapped to either the end or beginning edge of content, this condition may be indicated in a variety of ways, such as shading, haptic feedback (e.g., device vibration), a transition in the scroll speed, a reduce amount of scroll per unit drag, and/or a change in the direction of the list scroll. Such indications of an impending list boundary, such as the end or beginning of the list, in a scroll animation may be accomplished via an algorithm that defines an animation effect based on the visible portions of the document or list (i.e., those portions that appear in the display window) or the remaining portion or fraction of the document or list. Such an algorithm may also determine the direction to "snap" the document to the display (i.e., from the beginning to the end in a reverse scroll, or from the end to the beginning in a forward scroll). In some aspects, this visual indication of an impending list boundary and the pending wrapping and snapping of the list may include a resistive scroll animation upon nearing or reaching the edge of the document. In such a resistive scroll animation, the number of pixels physically touched by a finger dragging over a touch screen display (or other user input) is larger than the number of pixels through which the lists is scrolled in a normal scroll animation. This animation effect emulates the list dragging or resisting scrolling. Other similar effects may also or alternatively be implemented, such as stretching of the display or increasing the spacing between displayed list entries.

In an aspect, the methods and computing devices may be configured such that snapping of the list within the display is initiated upon the list boundary reaching a distance between the finger or document and the edge of the screen or viewable content area. In this aspect, the content may snap to align the corresponding edge of the document (e.g., the end or beginning of the document) with the edge of the screen or viewable content area (e.g., the top or bottom edge of the display).

In a further aspect, the methods and computing devices may be configured to avoid inadvertent actuation by not implementing the animation until the user's finger has moved a threshold distance on the touch screen display. Until that threshold distance is achieve, the content remains immobile. Once the threshold finger drag distance (or other user input threshold) is reached, the content may jump to the calculated "live-scroll" offset and continue the scroll animation of the various aspects from there.

For ease of reference, the various aspects are described with respect to displays of files in the form of lists having a beginning and an end. However, the aspects are not limited to lists, and are generally applicable to any document display application that enables users to move the content with respect to display screen (e.g., by a scroll or flick command) and to files that have boundaries beyond which a normal scroll would not continue. For example, the aspects may be applied to horizontal lists or file organizations, an example of which is an electronic book. An electronic book is typically organized as a file containing a plurality of page images or sub-files which may be organized into chapters. Electronic book applications enable scrolling through pages horizontally in response to user inputs (e.g., dragging a finger across the touch screen display in order to turn a "page"). The scrolling of an electronic book file may be enabled in a vertical direction from top to bottom of a single page, as well as in a horizontal direction from page to page. Thus, file boundaries in an electronic book may be encountered at the top and bottom of each page as well as in the first and last pages in each chapter or within the book itself. Therefore, references to lists, and the end and beginning of a list should be understand to encompass any type of scrollable electronic document having content boundaries beyond which a normal scroll function may be inhibited or prohibited.

Figure 1B:
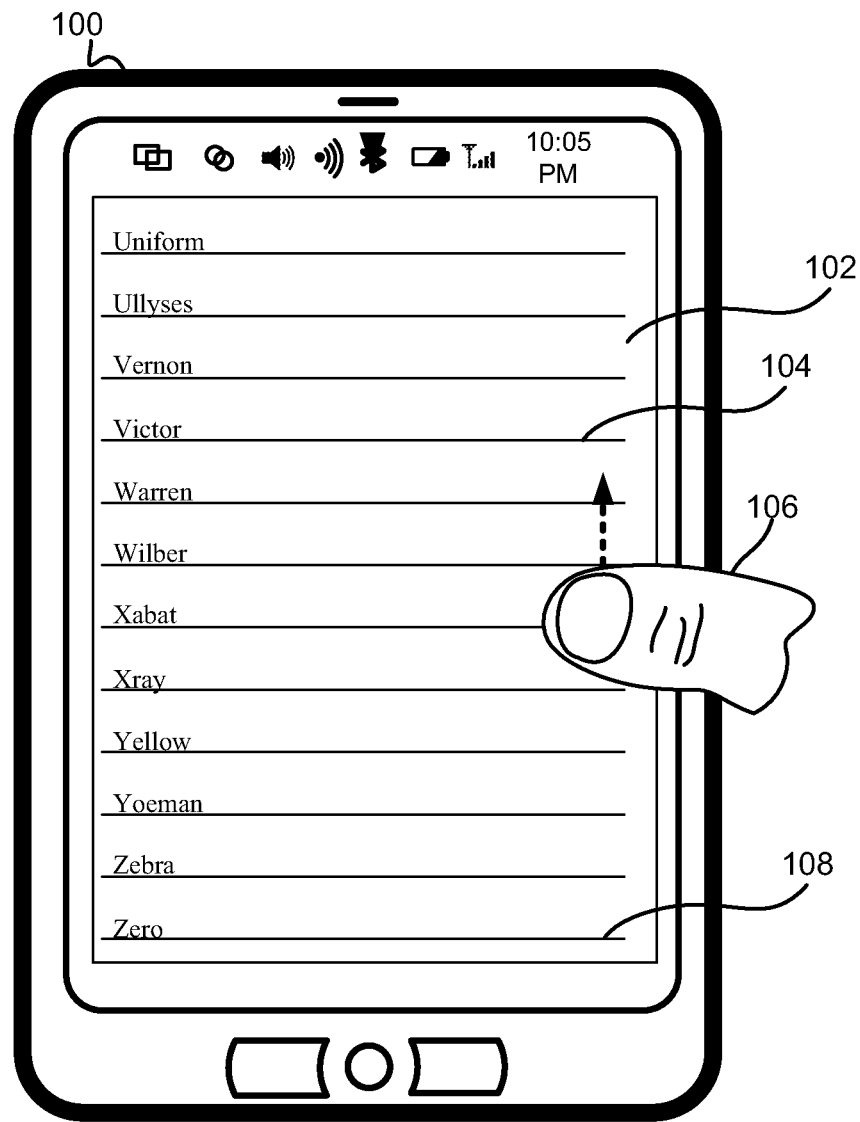

An example of functionality according to an aspect is illustrated in FIGS. 1A through 1D which show an example of a scrollable list in the form of a contact list organized in alphabetical order. Referring to FIG. 1A, such an application may be presented on the display 102 of a mobile computing device 100 in the form of a number of list entries 104. In this example, the list entries are organized in alphabetical order starting from a first entry 110 at top of the display 102 and including as many list entries 104 as will fit within the display area. In order to view portions of the list extending beyond the display area 102, a user may scroll through the list, such as by dragging a finger 106 on the touch screen display 102 in the direction that the user would like to scroll the list. This scrolling of the list may continue until the end of the list is reached. This is illustrated in FIG. 1B which shows the last entry 108 in the list 100 appearing at the bottom of the display area 102. At this point, a conventional user interface would require the user to reverse the direction of scrolling to return to the first entry 110 in the list, such as by dragging the finger 106 in a downward direction.

Figure 1C:
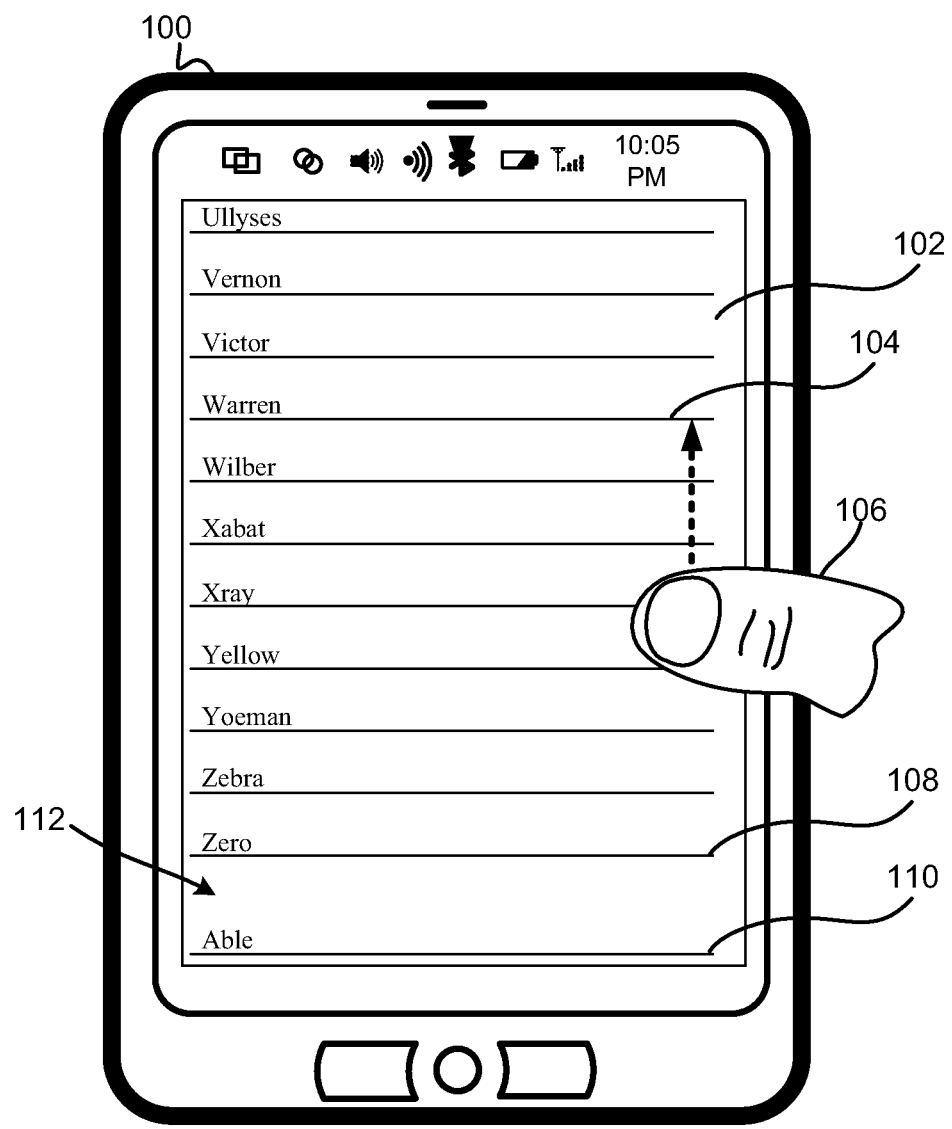
Figure 1D:
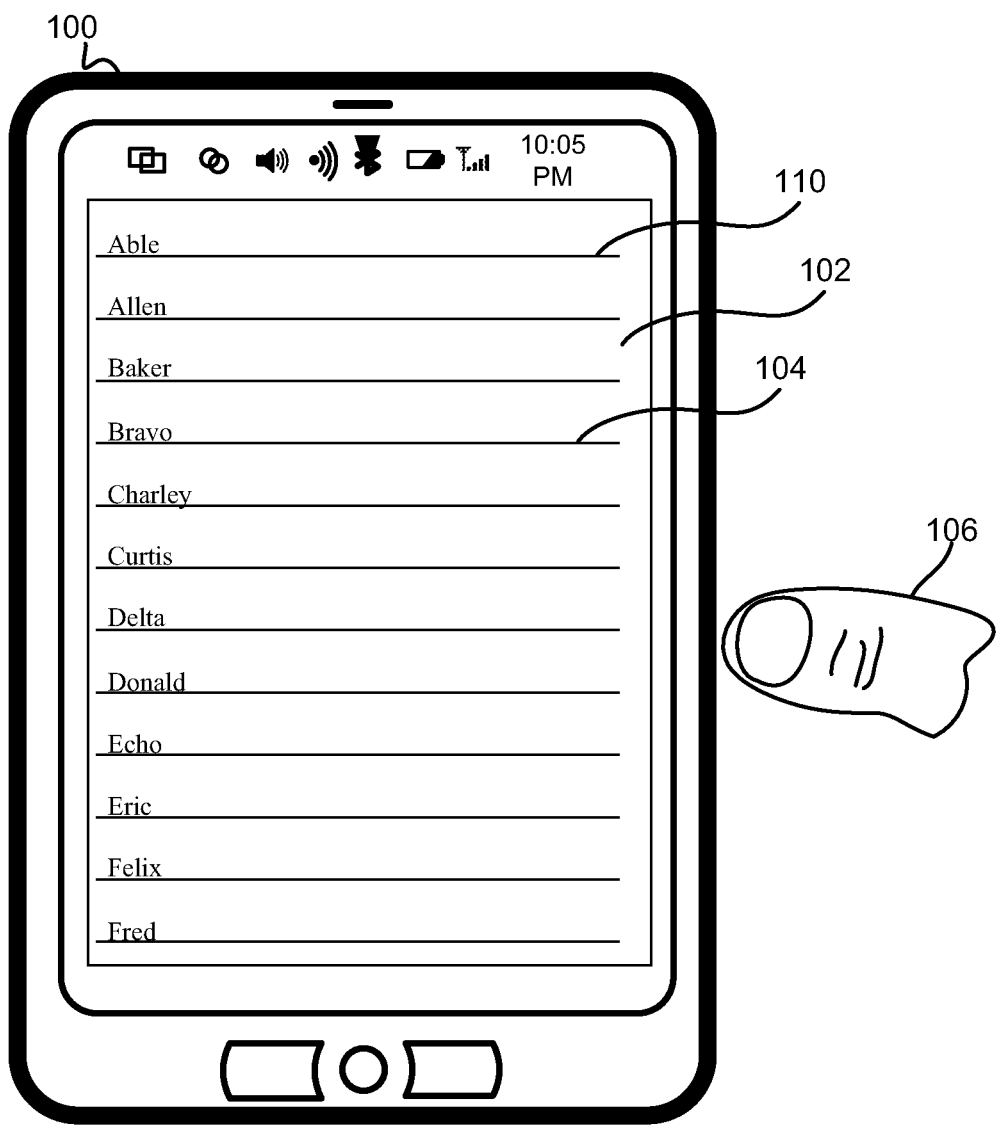

The various aspects permit the user to rapidly navigate the list from one end to the other by wrapping the list around so that the user can quickly access the beginning or end of the list. When a user input causes the list to reach the end or the beginning of the list (depending on the direction of the scroll input command), the other end (i.e., the beginning or end) of the list may be brought into view in order to indicate that the list is about to wrap as illustrated in FIG. 1C. As described in more detail below, the display may provide intuitive indications that the end of the list is being approached, such as by slowing the scroll rate or reducing the responsiveness of the scroll to a continued user finger drag on the touch screen display. For example, FIG. 1C illustrates an aspect in which continued dragging the user's finger 106 on the touch screen display results in the list moving more slowly (i.e., fewer pixels traversed every pixel covered by the finger drag) and forming a gap 112 between the last list entry 108 and the first list entry 110. Such visual indications alerts the user that the graphical user interface is about to wrap the list around to the beginning (or vice versa depending upon the scroll direction). To complete the list snap, the user may remove the finger 106 from the touch screen display 102, in response to which the graphical user interfaces of the computing device 100 causes the display to snap to the beginning of the list, placing the first item in the list 110 at the top of the display 102, as illustrated in FIG. 1D. This functionality enables a user to quickly move from the end of the list to the beginning of the list. If the user desires to scroll in the other direction (i.e., from the beginning of the list to the end of the list,), the user may simply reverse the direction of the finger drag on the touch screen display 102 (e.g., by dragging the finger 106 in a downward direction in the illustrated display).

While FIGS. 1A-D illustrate a finger drag input for completing a relatively slow scroll, similar methods may be implemented in a rapid or momentum scroll, such as may be initiated in response to a "flick" gesture executed on the touch screen display. In this aspect, a rapid movement of the user's finger 106 on the touch screen display 102 in a flick type motion will initiate a momentum scroll that rapidly scrolls through the list for a distance determined by the speed of the flick gesture. In the various aspects, if the projected end of the momentum scroll (i.e., the point at which the scrolling animation ceases) will extend beyond a list boundary (i.e., the end or beginning of the list), the graphical user interface may animate the list wrapping around the list boundary to the other end and snapping the new end in place on the display 102. This animation may include indications that the list boundary is being approached, such as accelerating when the end or beginning of the list is approached followed by snapping the list end or beginning to a corresponding edge e.g., top or bottom) of the display.

Figure 2:
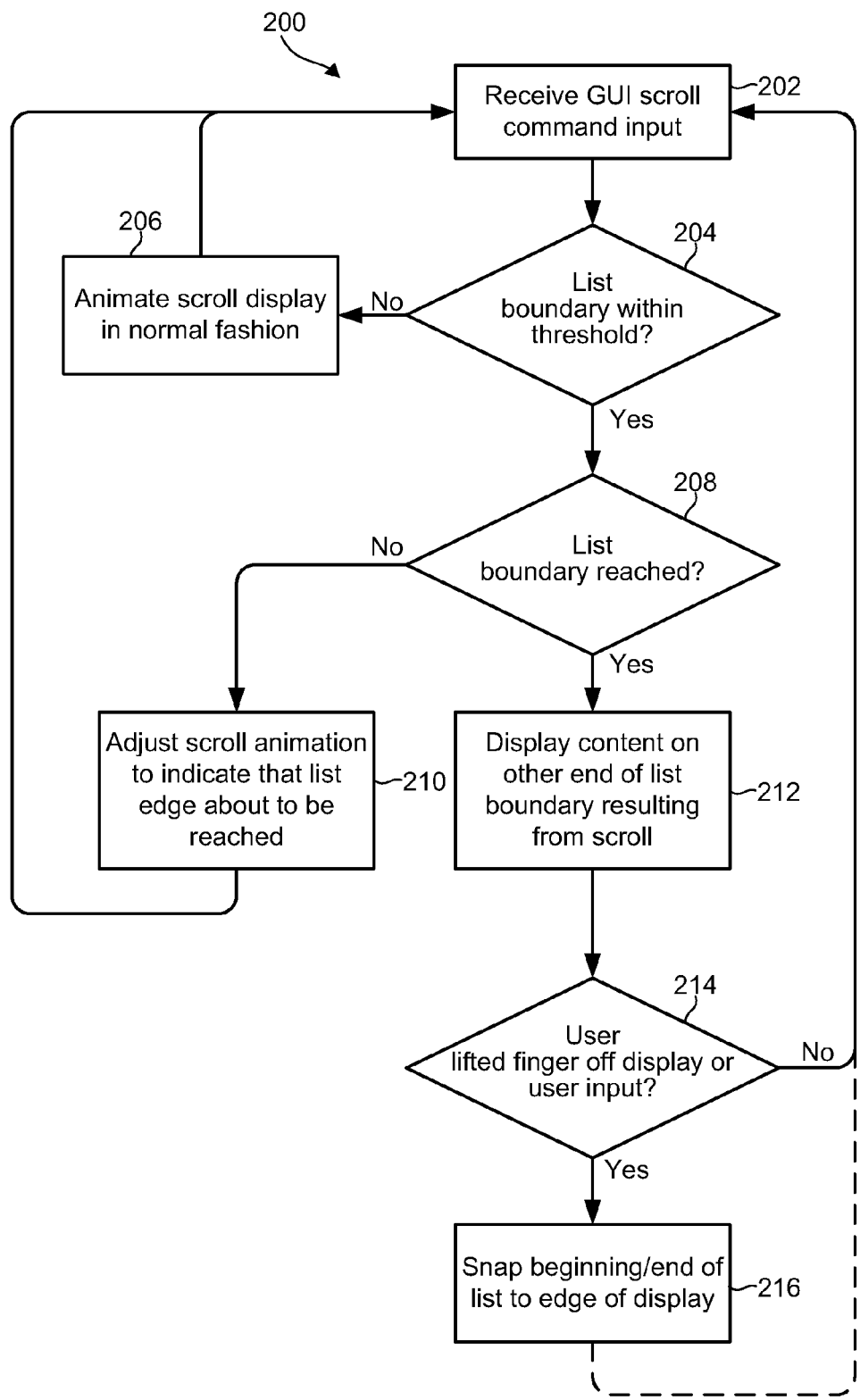
FIG. 2 is a process flow diagram of a method for presenting a list on a graphical user interface in response to a user scroll input command according to the various aspects.

An example method 200 for implementing an aspect response to a user scroll command (e.g., a drag input on a touch screen display) is illustrated in FIG. 2. This method 200 may be implemented within the processor or display processor of a computing device by configuring the processor with suitable processor-executable instructions. In method 200 in block 202, the computing device processor may receive a user scroll command input from the graphical user interface. For example, this input may be received from a touch screen display in response to the user touching the surface with a finger and moving it in a linear fashion. In computing devices equipped with other types of user input devices, such a scroll command user input may be received from a touchpad, a trackball, computer mouse or other suitable user input device. In determination block 204, the processor may determine whether a list boundary is within a threshold distance of an edge of the display. This determination may be based upon the received user input and the current position of the list with respect to the display. If a list boundary is not within the threshold distance of a display boundary (i.e., determination block 204="No"), the processor may continue to animate the scrolling motion of the list in a normal fashion in block 206. This process may continue with the processor returning to receive further user inputs in block 202 until such time as the user input causes a list boundary to fall within the threshold distance of the display (i.e., determination block 204="Yes"). When this condition occurs, the processor may further determine whether the list boundary is reached (i.e., the list boundary appears within the display window) in determination block 208. If the list boundary has not been reached (i.e., determination block 208="No"), the processor may adjust the scroll animation to indicate that a list boundary is about to be reached in block 210. Such adjustments to the scroll animation may include slowing the scroll rate, shading the list, changing the ratio of the scroll movement to the user input such as to appear to resist movement or require greater user input to achieve the same amount of scroll movement, shaking the display, or other visible effects. In an aspect, other haptic feedback mechanisms may also or alternatively be implemented in order to inform the user of the pending list boundary. The processor may then return to block 202 to receive further user inputs.

Once a list boundary is reached so the beginning or the end of the list appears at that the top or bottom of the display window (i.e., determination block 208="Yes"), the processor may display a portion of the content on the other side of the list boundary in response to further user scroll command inputs in block 212. For example, as illustrated in FIG. 1C, when the user continues to scroll after the end of the list is presented, a portion of the beginning of the list may be presented on the display in block 212. In determination block 214, the device processor may determine from the graphical user interface whether the user has suspended the scroll command, such as by lifting a finger off of the touch screen display or off of a mouse button. If the user has not suspended the scroll command (i.e., determination block 214="No"), the processor may continue to receive further user inputs by returning to block 202. Once the user has terminated the scroll input, such as by lifting a finger off the touch screen display (i.e., determination block 214="Yes"), the processor may wrapping the list to the other end (i.e., the beginning or end depending upon the direction of the scroll and the encountered boundary) and snap the list to the display as appropriate in block 216. For example, snapping of the list would position a first list entry at the top of the display window or position a last list entry at the bottom of the display window depending upon the direction of the scroll movement. Thereafter, the processor may wait further user input by returning to block 202.

Figure 3:
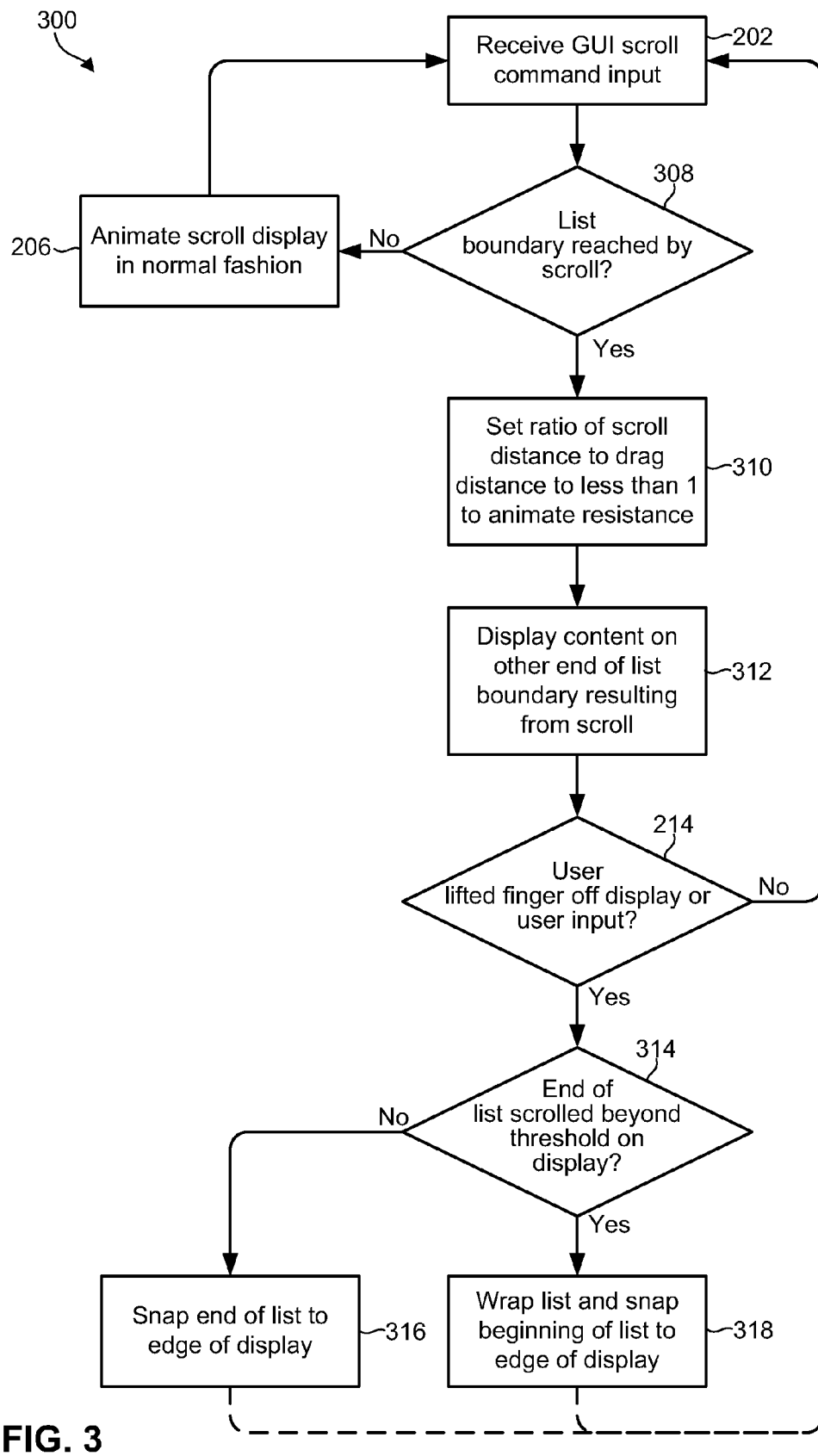
FIG. 3 is a process flow diagram of another method for presenting a list on a graphical user interface in response to a user scroll input command according to the various aspects.

Another aspect method 300 is illustrated in FIG. 3. This method 300 includes similar operations that may be implemented as described above with reference to FIG. 2 for like numbered blocks. In response to receiving user inputs to initiate a scroll operation in block 202, the processor may determine whether the list boundary is reached by the commanded scroll in determination block 308. In this method 300, determination block 308 incorporates or combines the determination operations in blocks 204 and 208 described above with reference to FIG. 2. If a list boundary has not been reached by the scroll input commands (i.e., determination block 308="No"), the processor may continue to animate the scroll display in the normal fashion in block 206. On the other hand, once a list boundary is reached by the scroll operation (i.e., determination block 308="Yes"), the processor may implement a change to the scroll animation in block 310 to indicate that the list boundary is reached, such as by setting the scroll distance to finger drag distance ratio to less than one in order to animate resistance. In block 312, the processor may display a portion of the content on the other side of the list boundary resulting from the resisted scroll (e.g., illustrated in FIG. 1C). In determination block 214, the processor may determine whether the scroll input has ended, such as by determining whether the user has with a finger off of the touch screen display. So long as the user's scroll input continues (i.e., determination block 214="No"), the processor may continue returning to block 202 to receive further user inputs. Once the processor determines that the scroll input command has ceased (i.e., determination block 214="Yes"), the processor may determine whether the scroll input has caused the end of the list to be scrolled beyond a threshold distance with respect to an edge of the display window. This threshold distance may be some fraction of a percentage of the display or distance from the top or bottom boundary of the display. If the processor determines that the end of the list was not scroll beyond that threshold distance (i.e., determination block 314="No"), the processor may snap the list so that the current list boundary (beginning or end)s appears at the appropriate top or bottom of the display window in block 316. On the other hand, if the end of the list has been scrolled beyond the threshold distance (i.e., determination block 314="Yes"), in block 318 the processor may wrap the list and snap the appropriate beginning or end of the list to the corresponding edge of the display (top or bottom) depending to the direction of the scroll command. After the list has been snapped to the appropriate end or beginning within the display, the processor may return to block 202 to receive further user inputs.

Figure 4:
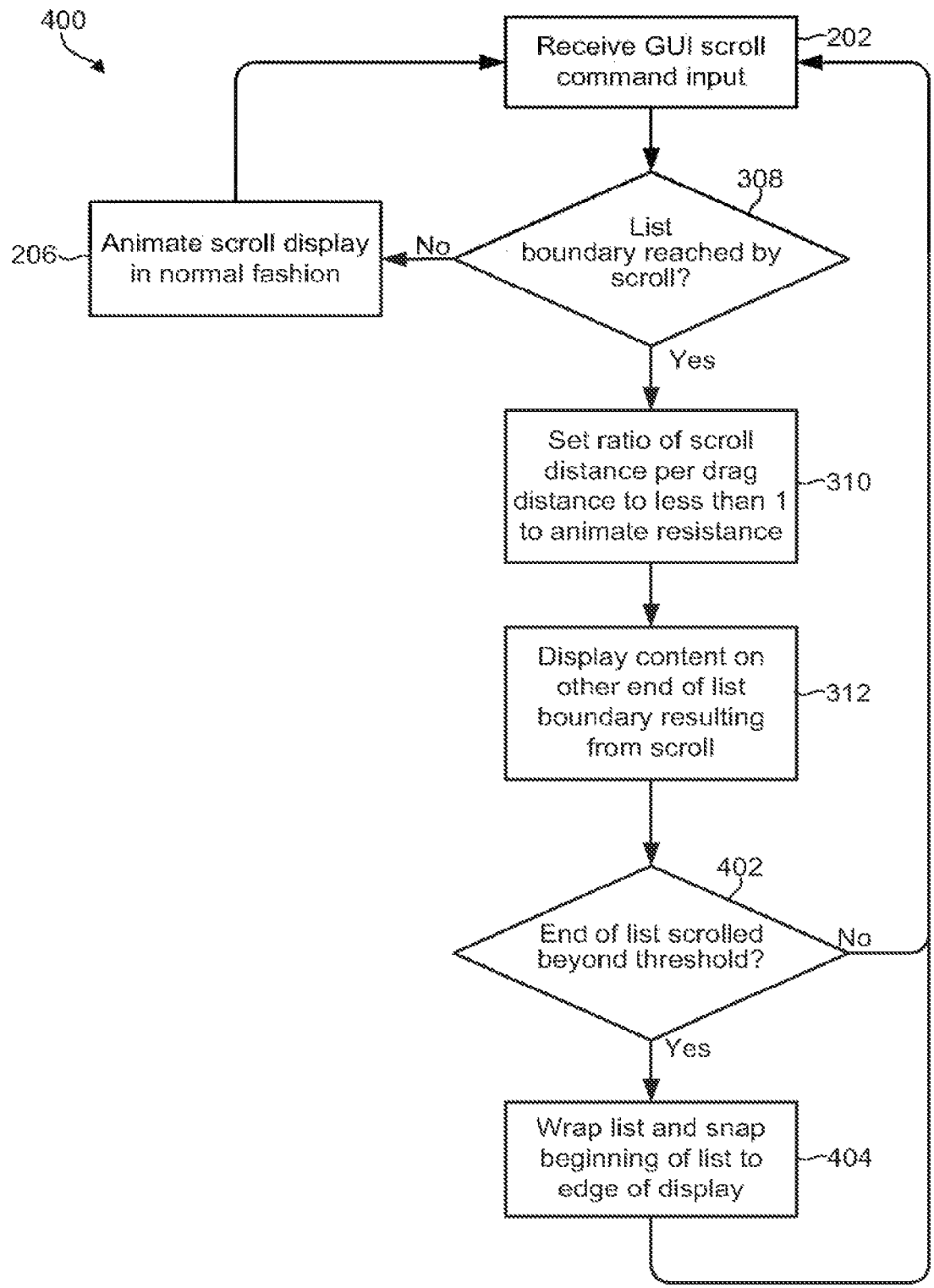
FIG. 4 is a process flow diagram of another method for presenting a list on a graphical user interface in response to a user scroll input command according to the various aspects.

Another aspect method 400 is illustrated in FIG. 4. In this aspect method, the wrapping of the list and the snapping of the next boundary (i.e., end or beginning is appropriate) to the display window may occur even while the user continues to make the scroll input. Thus, while displaying content on the other end of the list boundary resulting from the continued scroll input in block 312, the processor may determine whether the end of the list has been scrolled beyond a threshold distance in determination block 402. If not (i.e., determination block 402="No"), the processor may return to block 202 to receive further user inputs. However, when the processor determines that the user input has cause the list to scroll beyond the threshold distance (i.e., determination block 402="Yes"), the processor may wrap the list and snap the beginning or end to the appropriate top or bottom of the display in block 404. Since the user scroll input is continuing in this method, the processor may return to block 202 to receive further user inputs, which may lead to further scrolling after the snap operation is completed. It should be noted that this method 400 may also include the operations described above with reference to FIG. 3 for blocks 214 through 318 in order to also implement rapid positioning the list in response to the user ceasing the scroll input (e.g., lifting a finger from the touch screen display).

Figure 5:
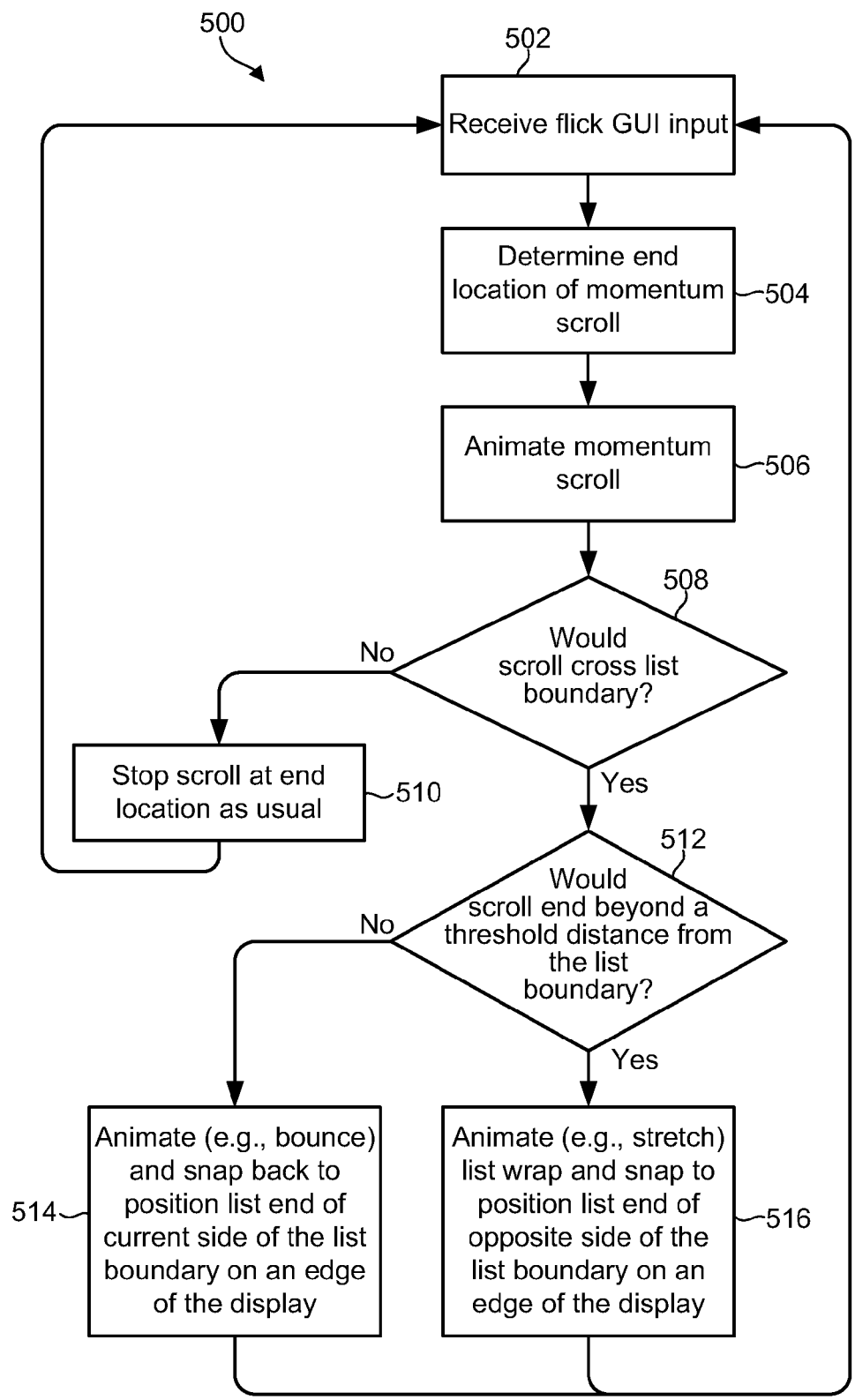
FIG. 5 is a process flow diagram of a method for animating a list scroll on a graphical user interface in response to a momentum scroll ("flick") user input according to the various aspects.

As mentioned above, the aspects may also be implemented with momentum scrolls, which are rapid list animations activated by a user "flick" gesture on a touch screen display. An example method 500 illustrating such an aspect is illustrated in FIG. 5. This method 500 may be implemented within the processor or display processor of a computing device by configuring the processor with suitable processor-executable instructions. In method 500 at block 502, the processor may receive and process a user flick gesture using methods well known for graphical user interfaces and touch screen displays. In block 504, the processor may determine from the received flick gesture characteristics the end location at the completion of the momentum scroll. This may be accomplished by determining a list scroll velocity and corresponding list scroll distance using the algorithms of the momentum scroll. In block 506, the processor may animate the momentum scroll in the normal fashion. In determination block 508, the processor may also determine whether the momentum scroll would cause a list boundary to cross an edge of the display (i.e., the list would scroll carry beyond the end or the beginning). If the processor determines that the momentum scroll will not cause a list boundary to cross an edge of the display (i.e., determination block 508="No"), the processor may continue the momentum scroll animation as usual stopping the scroll at the indicated location in block 510.

If the processor determines that the momentum scroll would cause a list boundary to cross an edge of the display (i.e., determination block 508="Yes"), the processor may then determine whether the scroll completion would be leave a list boundary (i.e., end or beginning) beyond the threshold distance from an edge of the display. For example, the processor may determine whether the end (or beginning) point of the list would appear more than one third the way up from the bottom (or down from the top) of the display. If the processor determines that the completion of the scroll would not cause a list boundary to fall beyond the threshold distance from an edge of the display (i.e., determination block 512="No"), the processor may animate the momentum scroll to include a bounce and snap back movement so that the end (or beginning) of the list on the current side of the list boundary ends up appearing that at the appropriate bottom or top of the display in block 514. The bounce and snap animation is just an illustrative example, and other effects may also be implemented for this condition (i.e., when determination block 512="No"). If the processor determines that the end of the momentum scroll would carry a list boundary beyond the threshold distance from an edge of the display (i.e., determination block 512="Yes"), the processor may animate the momentum scroll to include, for example, a stretch or other motion indicating that a list boundary has been reached, followed by a wrapping of the list and snapping of the other side of the list boundary to the corresponding top or bottom of the display window at the completion of the momentum scroll animation in block 516. Thus, if the momentum scroll would cause the list end to extend more than the threshold distance beyond an edge of the display window (such as one third of the display), the list wraps and the scroll promptly stops so that the beginning or end of the list aligns with the top or bottom of the display, respectively. Following these animations, the processor may return to block 202 to receive further user inputs.

Figure 6:
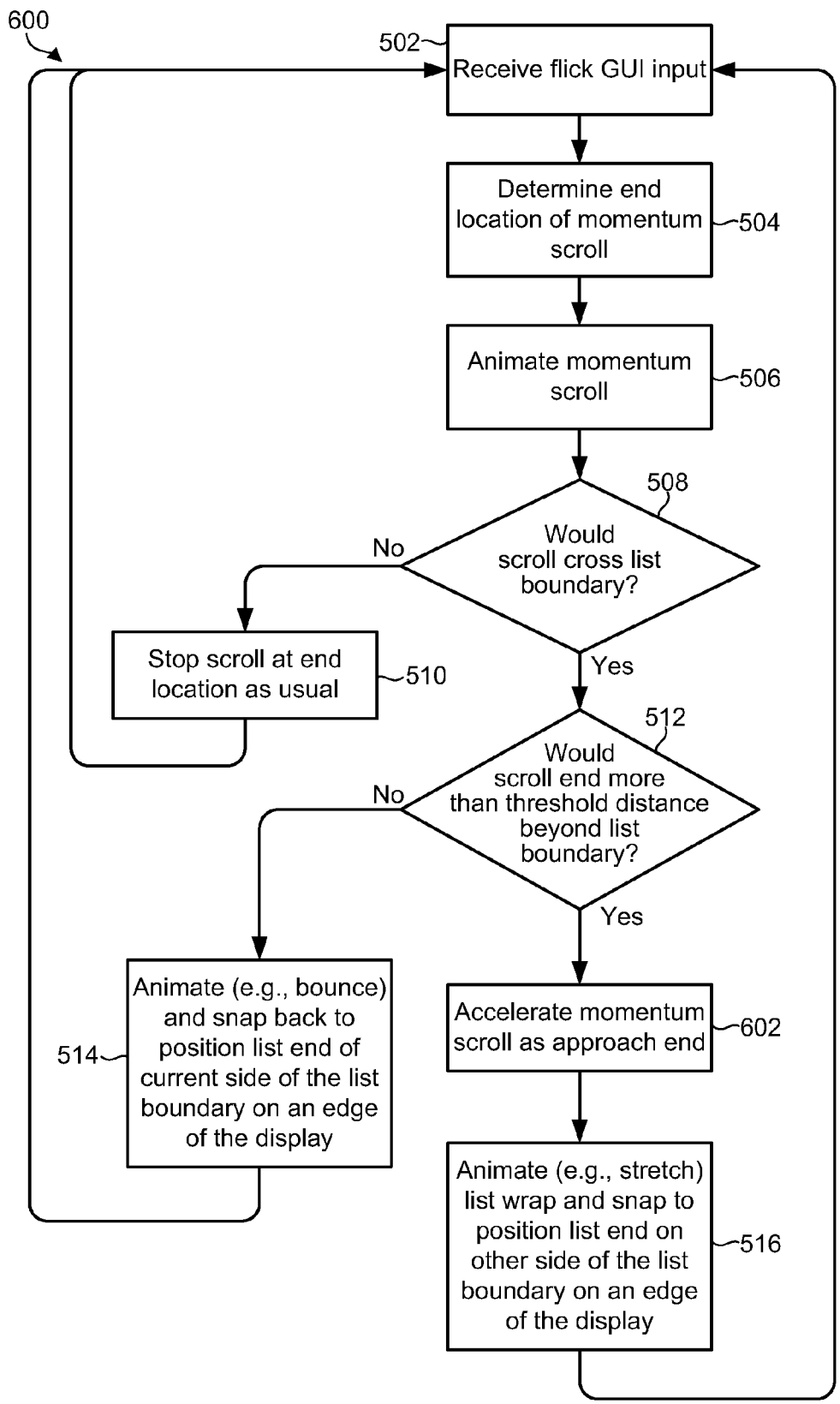
FIG. 6 is a process flow diagram of another method for animating a list scroll on a graphical user interface in response to a momentum scroll user input according to the various aspects.

An alternative method 600 for implementing a momentum scroll is illustrated in FIG. 6. In this method, the animation of the momentum scroll includes a further indication that a list wrap will occur at the end of the momentum scroll to inform the user that the list is about to wrap. For example, in block 602, the processor may animate the momentum scroll so that as the end of the list boundary is approached (i.e., the end or beginning of the list approaches the display area) the scroll rate accelerates, such as to simulate the list being attracted to the top or bottom of the display. This additional animation may then end in the same manner as described above with reference to block 516.

Figure 7:
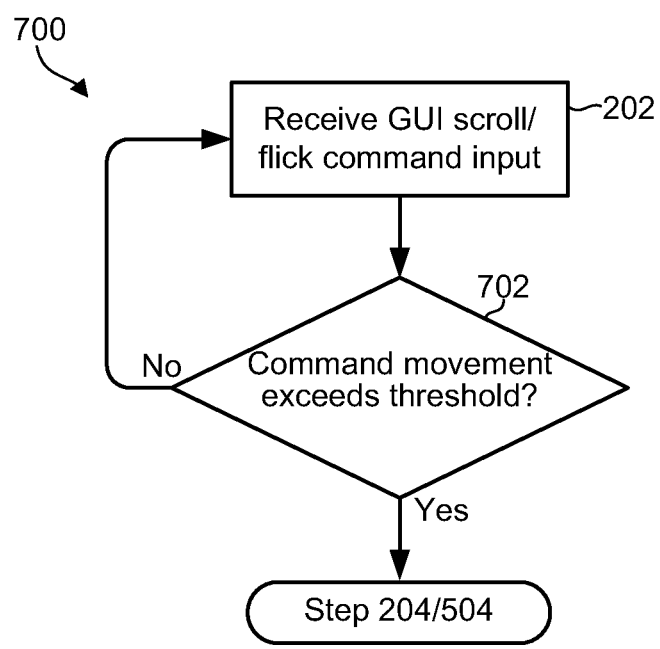
FIG. 7 is a portion of a flow diagram of a method for precluding inadvertent activation of the various aspect methods.

In an aspect method 700 illustrated in FIG. 7, the processor may be configured to evaluate whether the user inputs are intended to be a scroll input before implementing a list scroll animation. This determination can improve the user experience since normal manipulation of graphical user interfaces may include inputs that are similar to a list scroll even though the user does not intend for the aspect scroll animations be implemented. Aspect method 700 illustrates how the processor may be configured to determine whether a user input, such as a finger drag movement on a touch screen, exceeds a threshold distance in determination block 702 before the processor implements the aspect methods described above with reference to FIGS. 2-6. If the processor determines that the user input does not exceed that minimum threshold (i.e., determination block 702="No"), the processor may not implement a scroll operation and return to block 202 to receive further user inputs. Once the processor determines that the user input does exceed that minimum threshold (i.e., determination block 702="Yes"), the processor may implement the aspect animations described above with reference to FIGS. 2-6 by proceeding to determination block 204 described above with reference to FIG. 2, or determination block 504 described above with reference to FIG. 5. In so doing, the list scroll animation may jump to the same point in the list as would have been reached if the initial user inputs had not been ignored.

Figure 8:
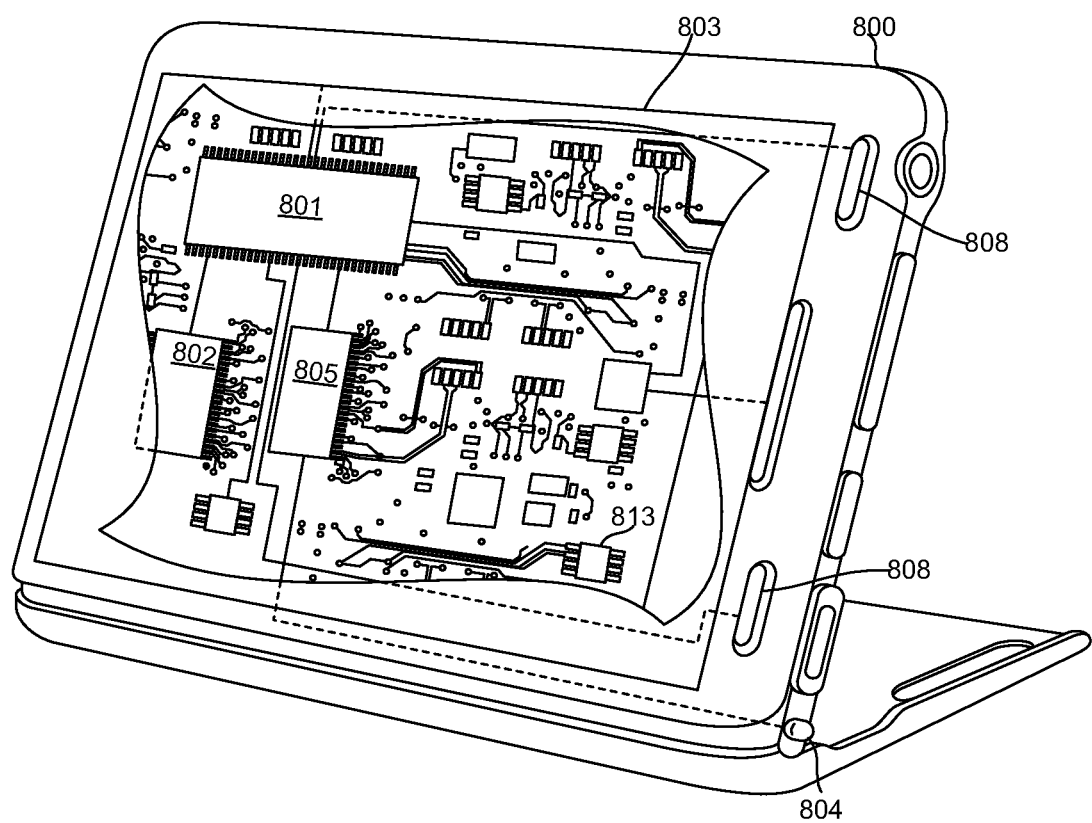
FIG. 8 is a component block diagram of an example mobile computing device suitable for use with the various embodiments.
Figure 9:
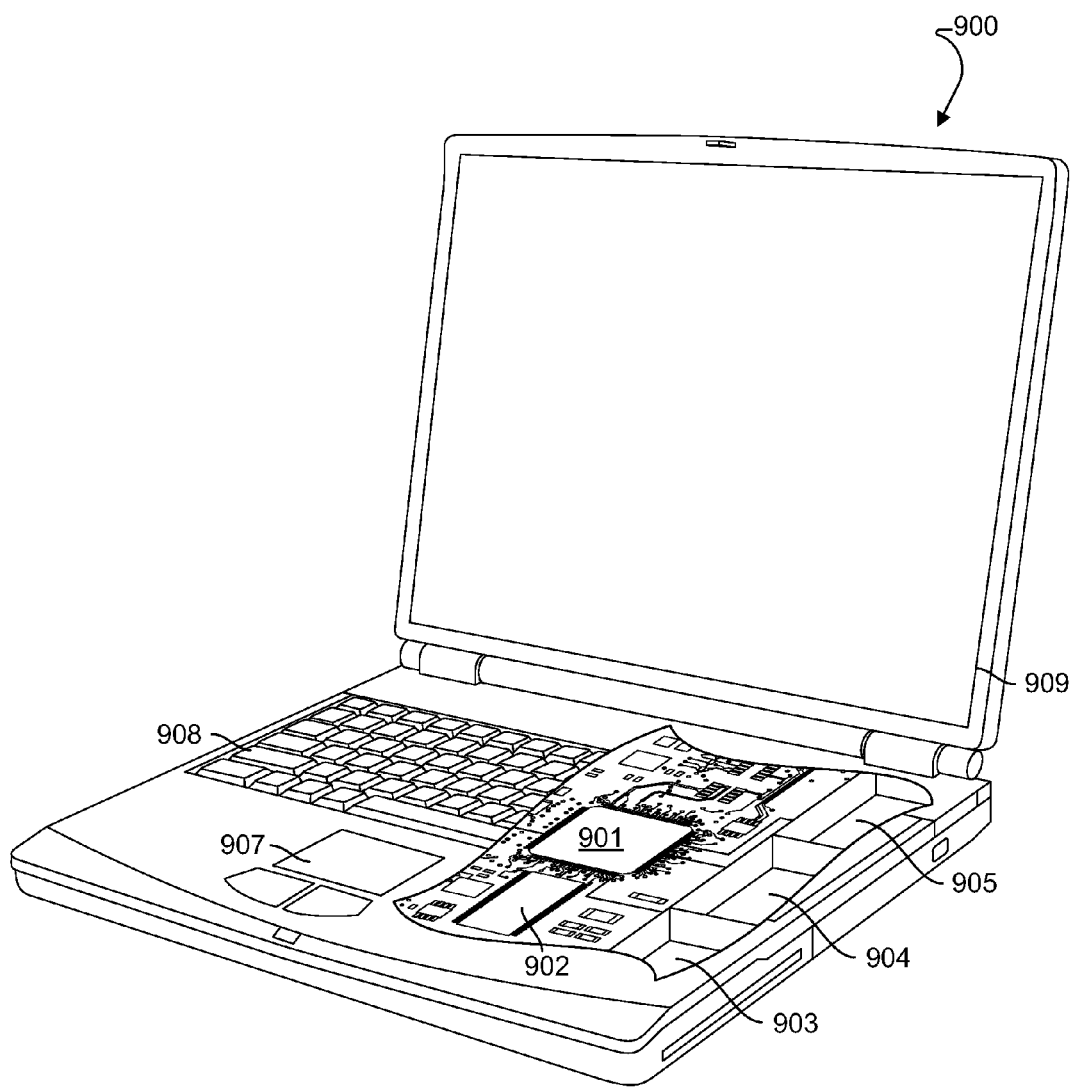
FIG. 9 is a component block diagram of an example personal computer suitable for use with various embodiments.

The various aspects may be implemented in any of a variety of computing devices, such as mobile computing devices and personal computers. An example of a mobile computing device is illustrated in FIG. 8, and an example of a notebook personal computer is illustrated in FIG. 9. For example, mobile computing devices 800 may include a processor 801 coupled to internal memory 802 and a touch screen display 803, such as a resistive-sensing touch screen, capacitive-sensing touch screen, infrared sensing touch screen, acoustic/piezoelectric sensing touch screen, or the like. The various aspects are not limited to any particular type of touch screen display 803 or touchpad technology. Additionally, the computing device 800 may have an antenna 804 for sending and receiving electromagnetic radiation that is connected to a wireless data link and/or cellular telephone transceiver 805 coupled to the processor 801. Mobile computing devices 800 may also include physical buttons 808 for receiving user inputs. In some implementations, a touch surface can be provided in areas of the electronic device 800 outside of the touch screen display 803. For example, a keypad (not shown) may include a touch surface with buried capacitive touch sensors. In other implementations, the touch screen display 803 may provide the complete GUI.

The aspects described above may also be implemented within a variety of personal computing devices, such as a laptop computer 900 as illustrated in FIG. 9. Many laptop computers include a touch pad touch surface 907 that serves as the computer's pointing device, and thus may receive drag, scroll, and flick gestures similar to those implemented on mobile computing devices equipped with a touch screen display and described above. A laptop computer 900 will typically include a processor 901 coupled to volatile memory 902 and a large capacity nonvolatile memory, such as a disk drive 903 of Flash memory. The computer 900 may also include a floppy disc drive 904 and a compact disc (CD) drive 905 coupled to the processor 901. The computer device 900 may also include a number of connector ports coupled to the processor 901 for establishing data connections or receiving external memory devices, such as a USB or FireWire® connector sockets, or other network connection circuits for coupling the processor 901 to a network. In a notebook configuration, the computer housing includes the touchpad 907, keyboard 908, and the display 909 all coupled to the processor 901. Other configurations of computing device may include a computer mouse or trackball coupled to the processor (e.g., via a USB input) as are well known, which may also be use in conjunction with the various aspects.

The computing device processor 801, 901 may be any programmable microprocessor, microcomputer or multiple processor chip or chips that can be configured by software instructions (applications) to perform a variety of functions, including the functions of the various aspects described above. In some computing devices 800, 900, multiple processors 801, 901 may be provided, such as multi-core processors or one processor dedicated to wireless communication functions and one processor dedicated to running other applications. The processor may also be included as part of a communication chipset.

The foregoing method descriptions and the process flow diagrams are provided merely as illustrative examples, and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such a non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of, non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for animating movement of content having content end boundaries within a display window of a computing device in response to a user input, comprising:

receiving a content display movement user input in the computing device;

initiating a scroll animation of the content in the display window;

determining an end location of a content movement based upon the user input;

determining whether the end location of the content movement would cause a content end boundary of the content not yet displayed to come within a first threshold distance of an edge of the display window;

modifying the scroll animation of the content to indicate the content end boundary is about to be reached when the content end boundary of the content not yet displayed is determined to be within the first threshold distance of the edge of the display window;

determining whether the determined end location of the content movement reaches the content end boundary;

determining whether the determined end location of the content movement would extend a display of the content end boundary a second threshold distance from the edge of the display window upon determining that the end location of the content movement reaches the content end boundary;

snapping an element of the content on a current side of the content end boundary to the display window in response to determining that the content display movement user input has ceased and that the determined end location of the content movement would not extend beyond the second threshold distance from the edge of the display window; and snapping an element of the content on an opposite side of the content end boundary to the display window so as to wrap the content in response to determining that the content display movement user input has ceased and that the determined end location of the content movement would extend beyond the second threshold distance from the edge of the display window, wherein snapping the element of the content on the opposite side of the content end boundary to the display comprises stretching a display element to provide a visual indication of wrapping of the content, and wherein the snapping an element of the content on the opposite side of the content end boundary occurs after the content display movement user input has ceased and before any additional user input is received.

2. The method of claim 1, wherein receiving a content display movement user input in the computing device comprises receiving an input in response to a user finger drag on a touch screen display, the method further comprising determining whether the user finger is no longer in contact with the touch screen display, and wherein determining whether the determined end location of the content movement would extend a display of the content end boundary the second threshold distance from an edge of the display window and snapping the element of the content to the display occurs in response to the user ceasing the user input.

3. The method of claim 1, further comprising initiating a momentum scroll animation of the content in the display window based upon a flick gesture input from the touch screen display,
wherein receiving a content display movement user input in the computing device comprises receiving the flick gesture input on a touch screen display, and
wherein determining an end location of a content movement based upon the user input comprises determining the end location of the content movement that will be reached in response to determining that the momentum scroll animation is completed.

4. The method of claim 3, further comprising accelerating the momentum scroll animation as the content end boundary approaches the edge of the display window prior to snapping an element of the content on an opposite side of the content end boundary to the display window in response to determining that the determined end location of the content movement would extend beyond the second threshold distance from the edge of the display window.

5. The method of claim 1, wherein the content is an electronic book, and the element is a page of the electronic book.

6. The method of claim 1, wherein the first threshold distance is one third of the display window.

7. The method of claim 1, wherein modifying the scroll animation of the content comprises changing a ratio of the scroll animation to the content display movement user input.

8. The method of claim 1, wherein modifying the scroll animation of the content comprises shaking the display window.

9. The method of claim 1, wherein modifying the scroll animation of the content comprises shading the content.

10. The method of claim 1, further comprising providing haptic feedback when the content end boundary of the content not yet displayed is determined to be within the first threshold distance of the edge of the display window.

11. A computing device, comprising:
a display;
a user interface; and
a processor coupled to the display and the user interface, wherein the processor is configured with processor-executable instructions to perform operations comprising:
receiving a content display movement user input from the user interface;
initiating a scroll animation on the display of content based upon the content display movement user input from the user interface, wherein the content has content end boundaries;
determining an end location of a content movement based upon the user input;
determining whether the end location of the content movement would cause a content end boundary of the content not yet displayed to come within a first threshold distance of an edge of the display;
modifying the scroll animation of the content to indicate the content end boundary is about to be reached when the content end boundary of the content not yet displayed is determined to be within the first threshold distance of the edge of the display;
determining whether the determined end location of the content movement reaches the content end boundary;
determining whether the determined end location of the content movement would extend a display of the content end boundary a second threshold distance from the edge of the display upon determining that the end location of the content movement reaches the content end boundary;
snapping an element of the content on a current side of the content end boundary to the display in response to determining that the content display movement user input has ceased and that the determined end location of the content movement would not extend beyond the second threshold distance from the edge of the display; and
snapping an element of the content on an opposite side of the content end boundary to the display so as to wrap the content in response to determining that the content display movement user input has ceased and that the determined end location of the content movement would extend beyond the second threshold distance from the edge of the display, wherein snapping the element of the content on an opposite side of the content end boundary to the display comprises stretching of a display element to provide a visual indication of wrapping of the content, and wherein the snapping an element of the content on the opposite side of the content end boundary occurs after the content display movement user input has ceased and before any additional user input is received.

12. The computing device of claim 11, wherein the display and the user interface are a touch screen display, and wherein the processor is configured such that:
receiving a content display movement user input from the user interface comprises receiving an input in response to a user finger drag on the touch screen display; and
determining whether the determined end location of the content movement would extend a display of the content end boundary the second threshold distance from an edge of the display and snapping the element of the content to the display occurs in response to the user ceasing the user input,
wherein the processor is configured with processor-executable instructions to perform operations further comprising determining whether the user finger is no longer in contact with the touch screen display.

13. The computing device of claim 11, wherein the display and the user interface are a touch screen display, and wherein the processor is configured with processor-executable instructions to perform operations further comprising initiating a momentum scroll animation, wherein:

receiving a content display movement user input from the user interface comprises receiving a flick gesture input on the touch screen display; and determining an end location of a content movement based upon the user input comprises determining the end location of the content movement that will be reached in response to determining that the momentum scroll animation is completed.

14. The computing device of claim 13, wherein the processor is configured with processor-executable instructions to perform operations further comprising accelerating the momentum scroll animation as the content end boundary approaches the edge of the touch screen display prior to snapping an element of the content on an opposite side of the content end boundary to the display in response to determining that the determined end location of the content movement would extend beyond the second threshold distance from the edge of the touch screen display.

15. A computing device, comprising:

a display;

means for receiving a content display movement user input;

means for initiating a scroll animation on the display of content based upon the content display movement user input, wherein the content has content end boundaries;

means for determining an end location of a content movement based upon the user input;

means for determining whether the end location of the content movement would cause a content end boundary of the content not yet displayed to come within a first threshold distance of an edge of the display;

means for modifying the scroll animation of the content to indicate the content end boundary is about to be reached when the content end boundary of the content not yet displayed is determined to be within the first threshold distance of the edge of the display;

means for determining whether the determined end location of the content movement reaches the content end boundary;

means for determining whether the determined end location of the content movement would extend a display of the content end boundary a second threshold distance from the edge of the display upon determining that the end location of the content movement reaches the content end boundary;

means for snapping an element of the content on a current side of the content end boundary to the display in response to determining that the content display movement user input has ceased and that the determined end location of the content movement would not extend beyond the second threshold distance from the edge of the display; and means for snapping an element of the content on an opposite side of the content end boundary to the display so as to wrap the content in response to determining that the content display movement user input has ceased and that the determined end location of the content movement would extend beyond the second threshold distance from the edge of the display, wherein the means for snapping the element of the content on an opposite side of the content end boundary to the display comprises means for stretching of a display element to provide a visual indication of wrapping of the content, and wherein snapping the element of the content on the opposite side of the content end boundary occurs after the content display movement user input has ceased and before any additional user input is received.

16. The computing device of claim 15, wherein the display and means for receiving a content display movement user input comprise a touch screen display, the computing device further comprising means for determining whether a user finger is no longer in contact with the touch screen display, wherein:

means for receiving a content display movement user input in the computing device comprises means for receiving an input in response to a user finger drag on the touch screen display; and means for snapping an element of the content on a current side of the content end boundary to the display and means for snapping an element of the content on an opposite side of the content end boundary to the display comprise means for determining whether the determined end location of the content movement would extend a display of the content end boundary the second threshold distance from an edge of the display window and snapping the element of the content to the display in response to the user ceasing the user input.

17. The computing device of claim 15, further comprising means for initiating a momentum scroll animation, wherein:

means for receiving a content display movement user input in the computing device comprises means for receiving a flick gesture input on a touch screen display; and means for determining an end location of a content movement based upon the user input comprises means for determining the end location of the content movement that will be reached in response to determining that the momentum scroll animation is completed.

18. The computing device of claim 17, further comprising means for accelerating the momentum scroll animation as the content end boundary approaches the edge of the display prior to snapping an element of the content on an opposite side of the content end boundary to the display in response to determining that the determined end location of the content movement would extend beyond the second threshold distance from the edge of the display.

19. A non-transitory computer readable storage medium having stored thereon processor-executable instructions configured to cause a computer processor to perform operations comprising:

receiving a content display movement user input;

initiating a scroll animation of content in a display window, wherein the content comprises content end boundaries;

determining an end location of a content movement based upon the user input;

determining whether the end location of the content movement would cause a content end boundary of the content not yet displayed to come within a first threshold distance of an edge of the display window;

modifying the scroll animation of the content to indicate the content end boundary is about to be reached when the content end boundary of the content not yet displayed is determined to be within the first threshold distance of the edge of the display window;

determining whether the determined end location of the content movement reaches the content end boundary;

determining whether the determined end location of the content movement would extend a display of the content end boundary a second threshold distance from the edge of the display window upon determining that the end location of the content movement reaches the content end boundary;

snapping an element of the content on a current side of the content end boundary to the display window in response to determining that the content display movement user input has ceased and that the determined end location of the content movement would not extend beyond the second threshold distance from the edge of the display window; and snapping an element of the content on an opposite side of the content end boundary to the display window so as to wrap the content in response to determining that the content display movement user input has ceased and that the determined end location of the content movement would extend beyond the second threshold distance from the edge of the display window, wherein snapping the element of the content on an opposite side of the content end boundary to the display comprises stretching of a display element to provide a visual indication of wrapping of the content, and wherein the snapping an element of the content on the opposite side of the content end boundary occurs after the content display movement user input has ceased and before any additional user input is received.

20. The non-transitory computer readable storage medium of claim 19, wherein the stored processor-executable instructions are configured to cause a computer processor to perform operations such that:

receiving a content display movement user input comprises receiving an input in response to a user finger drag on a touch screen display; and determining whether the determined end location of the content movement would extend a display of the content end boundary the second threshold distance from an edge of the display window and snapping the element of the content to the display occurs in response to the user ceasing the user input, wherein the stored processor-executable instructions are configured to cause a computer processor to perform operations further comprising determining whether the user finger is no longer in contact with the touch screen display.

21. The non-transitory computer readable storage medium of claim 19, wherein the stored processor-executable instructions are configured to cause a computer processor to perform operations such that:

receiving a content display movement user input comprises receiving a flick gesture input on a touch screen display;

initiating a momentum scroll animation of the content in the touch screen display in response to the flick gesture input; and determining an end location of a content movement based upon the user input comprises determining the end location of the content movement that will be reached in response to determining that the momentum scroll animation is completed.

22. The non-transitory computer readable storage medium of claim 21, wherein the stored processor-executable instructions are configured to cause a computer processor to perform operations further comprising:

accelerating the momentum scroll animation as the content end boundary approaches the edge of the touch screen display prior to snapping an element of the content on an opposite side of the content end boundary to the touch screen display in response to determining that the determined end location of the content movement would extend beyond the second threshold distance from the edge of the touch screen display.

* * * * *